United States Patent
Li et al.

(10) Patent No.: US 10,317,584 B2
(45) Date of Patent: Jun. 11, 2019

(54) GRATING COUPLER AND PREPARATION METHOD

(71) Applicant: Huawei Technologies Co., Ltd., Shenzhen (CN)

(72) Inventors: Ming Li, Wuhan (CN); Xin Tu, Wuhan (CN); Hongyan Fu, Shenzhen (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 0 days.

(21) Appl. No.: 15/835,748

(22) Filed: Dec. 8, 2017

(65) Prior Publication Data

US 2018/0095199 A1 Apr. 5, 2018

Related U.S. Application Data

(63) Continuation of application No. PCT/CN2015/081270, filed on Jun. 11, 2015.

(51) Int. Cl.
*G02B 6/00* (2006.01)
*G02B 5/18* (2006.01)
(Continued)

(52) U.S. Cl.
CPC .......... *G02B 5/18* (2013.01); *G02B 6/12004* (2013.01); *G02B 6/124* (2013.01); *G02B 6/1228* (2013.01);
(Continued)

(58) Field of Classification Search
CPC .......... G02B 5/18; G02B 6/1228; G02B 6/34; G02B 6/4206; G02B 6/12004; G02B 6/124; G02B 2006/12107; G02B 2006/12061
See application file for complete search history.

(56) References Cited

U.S. PATENT DOCUMENTS

| 8,493,562 B2 | 7/2013 | Kopp et al. |
| 2002/0181868 A1* | 12/2002 | McGreer ............ G02B 6/105 385/37 |

(Continued)

FOREIGN PATENT DOCUMENTS

| CN | 1629662 A | 6/2005 |
| CN | 101106164 A | 1/2008 |

(Continued)

OTHER PUBLICATIONS

Machine Translation and Abstract of Chinese Publication No. CN101106164, Jan. 16, 2008, 10 pages.

(Continued)

*Primary Examiner* — Ellen E Kim
(74) *Attorney, Agent, or Firm* — Conley Rose, P.C.

(57) ABSTRACT

A grating coupler and a preparation method thereof are provided. The grating coupler includes a substrate layer, a lower confining layer, a waveguide core layer, and an upper confining layer that are sequentially arranged. The waveguide core layer includes a submicron waveguide, a first tapered waveguide, and a waveguide array. The waveguide array includes at least two waveguide groups, the waveguide group includes at least one waveguide chain, the waveguide chain includes at least two waveguides that have different widths, and the waveguides in the waveguide chain are connected to each other. An end of the waveguide chain in the waveguide array is connected to a wide end of the first tapered waveguide, and a narrow end of the first tapered waveguide is connected to the submicron waveguide.

15 Claims, 7 Drawing Sheets

(51) Int. Cl.
*G02B 6/34* (2006.01)
*G02B 6/124* (2006.01)
*G02B 6/12* (2006.01)
*G02B 6/122* (2006.01)
*G02B 6/42* (2006.01)
*G02B 6/30* (2006.01)

(52) U.S. Cl.
CPC .............. *G02B 6/305* (2013.01); *G02B 6/34* (2013.01); *G02B 6/4206* (2013.01); *G02B 2006/12061* (2013.01); *G02B 2006/12107* (2013.01)

(56) References Cited

U.S. PATENT DOCUMENTS

| | | | |
|---|---|---|---|
| 2003/0174945 | A1 | 9/2003 | Fried et al. |
| 2004/0037503 | A1 | 2/2004 | Hastings et al. |
| 2005/0135748 | A1* | 6/2005 | Yamazaki .......... G02B 6/12007 385/37 |
| 2009/0238514 | A1 | 9/2009 | Hu et al. |
| 2010/0322559 | A1 | 12/2010 | Ogawa et al. |
| 2010/0329608 | A1* | 12/2010 | Ogawa .................. G02B 6/124 385/37 |
| 2014/0010498 | A1 | 1/2014 | Verslegers et al. |
| 2014/0169739 | A1 | 6/2014 | Huang |
| 2014/0314374 | A1 | 10/2014 | Fattal et al. |
| 2015/0331197 | A1 | 11/2015 | Verslegers et al. |
| 2017/0315387 | A1* | 11/2017 | Watts .................... G02F 1/025 |

FOREIGN PATENT DOCUMENTS

| | | | |
|---|---|---|---|
| CN | 101556356 | A | 10/2009 |
| CN | 101833138 | A | 9/2010 |
| CN | 101960346 | A | 1/2011 |
| CN | 101995609 | A | 3/2011 |
| CN | 103197386 | A | 7/2013 |
| CN | 103890624 | A | 6/2014 |
| CN | 103901563 | A | 7/2014 |
| CN | 104090333 | A | 10/2014 |
| JP | H07128530 | A | 5/1995 |
| JP | 2009230140 | A | 10/2009 |

OTHER PUBLICATIONS

Machine Translation and Abstract of Chinese Publication No. CN101556356, Oct. 14, 2009, 10 pages.
Machine Translation and Abstract of Chinese Publication No. CN101833138, Sep. 15, 2010, 8 pages.
Machine Translation and Abstract of Chinese Publication No. CN101995609, Mar. 30, 2011, 18 pages.
Machine Translation and Abstract of Chinese Publication No. CN103197386, Jul. 10, 2013, 19 pages.
Machine Translation and Abstract of Chinese Publication No. CN103901563, Jul. 2, 2014, 16 pages.
Machine Translation and Abstract of Chinese Publication No. CN104090333, Oct. 8, 2014, 15 pages.
Wang, Z., et al. "Experimental Demonstration of an ultracompact Polarization Beam Splitter Based on a Bidirectional Grating Coupler," SPIE-OSA-IEEE, vol. 7631, 2009, 7 pages.
Roelkens, G., et al. "Grating-Based Optical Fiber Interfaces for Silicon-on-Insulator Photonic Integrated Circuits," IEEE Journal of Selected Topics in Quantum Electronics, vol. 17, No. 3, May/Jun. 2011, pp. 571-580.
Selvaraja, S., et al., "Highly efficient grating coupler between optical fiber and silicon photonic circuit," OSA/CLEO/IQEC, IEEE 2009, 2 pages.
Foreign Communication From a Counterpart Application, PCT Application No. PCT/CN2015/081270, English Translation of International Search Report dated Mar. 21, 2016, 3 pages.
Foreign Communication From a Counterpart Application, PCT Application No. PCT/CN2015/081270, English Translation of Written Opinion dated Mar. 21, 2016, 6 pages.
Machine Translation and Abstract of Japanese Publication No. JPH07128530, May 19, 1995, 13 pages.
Foreign Communication From a Counterpart Application, European Application No. 15894646.7, Extended European Search Report dated May 9, 2018, 8 pages.
Machine Translation and Abstract of Chinese Publication No. CN1629662, Jun. 22, 2005, 14 pages.
Machine Translation and Abstract of Chinese Publication No. CN101960346, Jan. 26, 2011, 63 pages.

\* cited by examiner

GRATING COUPLER AND PREPARATION METHOD

CROSS-REFERENCE TO RELATED APPLICATIONS

This application is a continuation of International Application No. PCT/CN2015/081270, filed on Jun. 11, 2015, the disclosure of which is hereby incorporated by reference in its entirety.

TECHNICAL FIELD

The present disclosure relates to the field of optical communications technologies, and in particular, to a grating coupler and a preparation method thereof.

BACKGROUND

A silicon-based photonic integrated circuit (PIC) chip combines silicon-based photonics and optical communications technologies by uniformly preparing, at a silicon layer on an insulating substrate using silicon on insulator (SOI), communications devices such as a laser, a modulator, and a detector that are prepared on different material substrates, and therefore, is an important technology for further promoting global informatization. The silicon-based PIC chip may input or output an optical signal in a coupling manner, so as to perform optical signal interaction with an external device. In a commonly used coupling manner, a grating coupler inputs an external optical signal into the silicon-based PIC chip, or outputs an optical signal inside the silicon-based PIC chip outside the silicon-based PIC chip in a diffraction manner using a top surface or a bottom surface of the silicon-based PIC chip as an incident surface.

A bandwidth of the grating coupler represents a spectrum range of an optical signal that can be coupled using the grating coupler. A higher bandwidth indicates a larger spectrum range of an optical signal that can be coupled and a greater amount of optical signal information that can be transmitted. However, a bandwidth of a conventional grating coupler in the prior art is always relatively low. For example, reference may be made to FIG. 1 for a top view of a conventional grating coupler in the prior art, and reference may be made to FIG. 2 for a normalized transmission spectrum of the conventional grating coupler in the prior art. The normalized transmission spectrum represents a correspondence between transmission energy of the grating coupler for an optical signal and a wavelength of the optical signal, that is, represents a correspondence between coupling efficiency of the grating coupler for the optical signal and the wavelength of the optical signal. A wavelength that has a smallest energy loss in the normalized transmission spectrum is a wavelength of the grating coupler that has highest coupling efficiency, and may be referred to as a coupling center wavelength of the grating coupler. In addition, when a wavelength of an optical signal more approximates to the coupling center wavelength, the grating coupler has higher coupling efficiency. It may be learned from FIG. 2 that, a coupling center wavelength of the conventional grating coupler shown in FIG. 1 is 1550 nanometer (nm), a wavelength range corresponding to 3 decibels (dB) energy is about 30 nm, and a spectrum range of an optical signal corresponding to the 3 dB energy, that is, a bandwidth of 3 dB is about 3.8 terahertz (THz). Therefore, a requirement for wide-spectrum optical communication is hardly met.

SUMMARY

Embodiments of the present disclosure provide a grating coupler and a preparation method thereof, so as to resolve a problem in the prior art that a bandwidth of a conventional grating coupler is low.

To achieve the foregoing objective, the following technical solutions are used in the embodiments of the present disclosure.

According to a first aspect, a grating coupler is provided, including a substrate layer, a lower confining layer, a waveguide core layer, and an upper confining layer that are sequentially arranged; where the waveguide core layer includes a submicron waveguide, a first tapered waveguide, and a waveguide array; the waveguide array includes at least two waveguide groups, the waveguide group includes at least one waveguide chain, the waveguide chain includes at least two waveguides that have different widths, the waveguides in the waveguide chain are connected to each other, waveguides in the waveguide chains included in a same waveguide group have a same width and a same arrangement structure, and waveguides in the waveguide chains included in different waveguide groups have different widths and/or different arrangement structures; and an end of the waveguide chain in the waveguide array is connected to a wide end of the first tapered waveguide, and a narrow end of the first tapered waveguide is connected to the submicron waveguide.

According to a second aspect, a grating coupler preparation method is provided, including preparing a substrate layer; preparing a lower confining layer based on the substrate layer; preparing a waveguide core layer based on the lower confining layer, where the waveguide core layer includes a submicron waveguide, a first tapered waveguide, and a waveguide array, the waveguide array includes at least two waveguide groups, the waveguide group includes at least one waveguide chain, the waveguide chain includes at least two waveguides that have different widths, the waveguides in the waveguide chain are connected to each other, waveguides in the waveguide chains included in a same waveguide group have a same width and a same arrangement structure, and waveguides in the waveguide chains included in different waveguide groups have different widths and/or different arrangement structures; where an end of the waveguide chain in the waveguide array is connected to a wide end of the first tapered waveguide, and a narrow end of the first tapered waveguide is connected to the submicron waveguide; and preparing an upper confining layer based on the waveguide core layer.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

Figure 1:
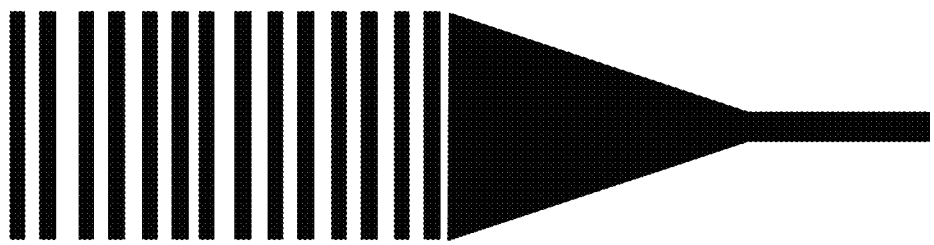
FIG. 1 is a top view of a conventional grating coupler in the prior art.
Figure 2:
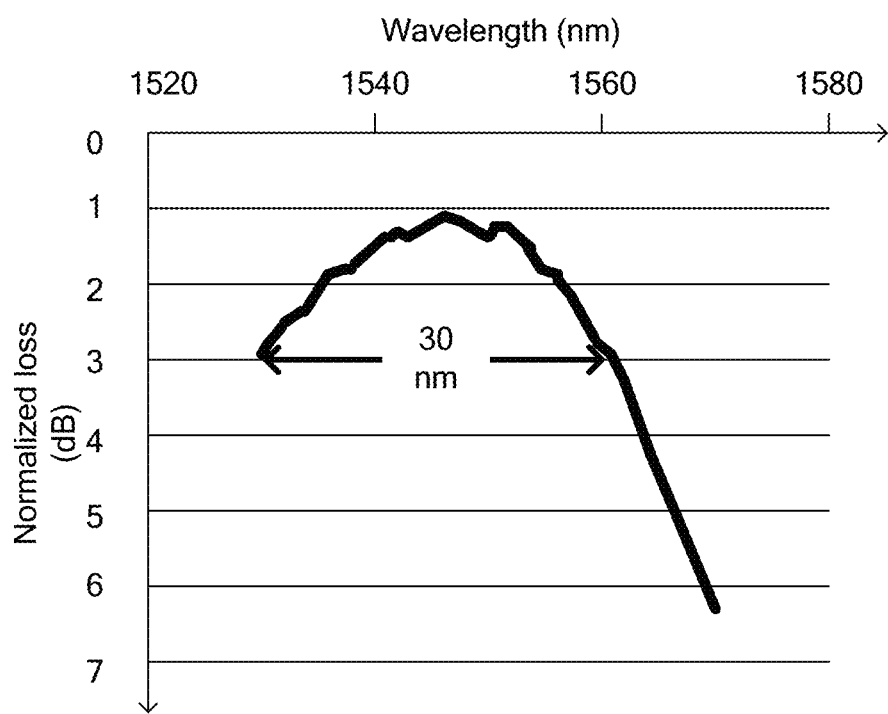
FIG. 2 is a normalized transmission spectrum of a conventional grating coupler in the prior art.

Reference signs in the drawings: 0—substrate layer; 1—lower confining layer; 2—waveguide core layer; 3—upper confining layer; 4—submicron waveguide; 5—first tapered waveguide; 6—waveguide array; 71—first waveguide group; 72—second waveguide group; 73—third waveguide group; 74—fourth waveguide group; 75—fifth waveguide group; 76—sixth waveguide group; 81—first waveguide chain; 82—second waveguide chain; 83—third waveguide chain; 84—fourth waveguide chain; 85—fifth waveguide chain; 86—sixth waveguide chain; 87—seventh waveguide chain; 88—eighth waveguide chain; 89—ninth waveguide chain; 91—first waveguide; 92—second waveguide; 93—third waveguide; 94—fourth waveguide; 10—second tapered waveguide; 11—optical fiber; 12—normal line; 13—included angle between an axis of an optical fiber and a normal line.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the description of the present disclosure, it should be understood that directions or position relationships indicated by terms "up", "down", and the like are based on directions or position relationships shown by the accompanying drawings, which are used only for describing the present disclosure and for description simplicity, but do not indicate or imply that an indicated apparatus or component must have a specific orientation or must be constructed and operated in a specific orientation. Therefore, this cannot be understood as a limitation on the present disclosure.

A grating coupler is mainly an optical device that performs optical signal coupling using diffraction characteristics and a grating that is formed by arranging multiple waveguides. Therefore, a basic grating equation is met:

$$k_0 n_{\mathit{eff}} - k_0 n_c \sin\theta = \frac{2\pi}{\Lambda}.$$

$n_{\mathit{eff}}$ represents an effective refractive index of a waveguide in the grating, and represents a phase velocity value of an optical signal that can be transmitted in the waveguide. The waveguides have different parameters (for example, widths) and are corresponding to different effective refractive indexes. A conventional grating usually includes waveguides that have only one width. Therefore, $\Lambda$ usually represents a coupling center wavelength of a waveguide in the grating, that is, a wavelength that has highest coupling efficiency in a normalized transmission spectrum of the waveguide, $k_0$ represents a wave vector in a vacuum, $n_c$ represents a waveguide cladding refractive index, and $\theta$ represents an angle of incidence of an optical signal. That is, in the grating coupler, the foregoing correspondence exists between an effective refractive index of a waveguide and a coupling center wavelength of the waveguide.

In addition, optical signals may include an optical signal that is in a transverse electric (TE) polarization mode and an optical signal that is in a transverse magnetic (TM) polarization mode. For optical signals in different polarization modes, because factors such as characteristics and border conditions thereof are different, effective refractive indexes generated when a same waveguide transmits the optical signals in different polarization modes are different. That is, in different polarization modes, different correspondences exist between a width of a waveguide and an effective refractive index.

Because a correspondence exists between an effective refractive index and a coupling center wavelength of a waveguide, both a different polarization mode of an optical signal and a different width of the waveguide affect the effective refractive index of the waveguide. Therefore, a coupling center wavelength of a grating coupler is associated with two factors, that is, a width of a waveguide in a grating and a polarization mode of an optical signal.

In addition, a main function of a grating coupler is to couple a to-be-coupled optical signal from an optical device into another optical device, and when a center wavelength of an optical signal more approximates to a coupling center wavelength, the grating coupler has higher coupling efficiency. Therefore, the coupling center wavelength of the grating coupler should approximate to a center wavelength of the to-be-coupled optical signal as much as possible, so that the grating coupler has relatively high coupling efficiency for the to-be-coupled optical signal.

An embodiment of the present disclosure provides a grating coupler that may include a substrate layer, a lower confining layer, a waveguide core layer, and an upper confining layer that are sequentially arranged, where the waveguide core layer may include a submicron waveguide, a first tapered waveguide, and a waveguide array, the waveguide array may include at least two waveguide groups, the waveguide group includes at least one waveguide chain, the waveguide chain may include at least two waveguides that have different widths, the waveguides in the waveguide chain are connected to each other, waveguides in the waveguide chains included in a same waveguide group have a same width and a same arrangement structure, and waveguides in the waveguide chains included in different waveguide groups have different widths and/or different arrangement structures; where an end of the waveguide chain in the waveguide array is connected to a wide end of the first tapered waveguide, and a narrow end of the first tapered waveguide is connected to the submicron waveguide.

In the grating coupler, both a refractive index of a material used for the lower confining layer and a refractive index of a material used for the upper confining layer are less than a refractive index of a material used for the waveguide core layer. Therefore, a total reflection condition can be met, so that an optical signal diffracted into the grating coupler is confined between the upper confining layer and the lower confining layer due to a total reflection effect, and is transmitted through the waveguide core layer. The waveguide core layer and the substrate layer are usually silicon materials, the upper confining layer and the lower confining layer are usually silicon dioxide materials, and the upper confining layer is a transparent material. Certainly, a specific material used in each component of the grating coupler is not limited in this embodiment of the present disclosure.

In the waveguide core layer of the foregoing grating coupler, the waveguide array forms a grating. Waveguides in the waveguide array may be cyclically arranged or may be pseudo-cyclically arranged, the formed grating may be a uniform grating or may be a non-uniform grating, and this is not limited herein. The first tapered waveguide used to connect the waveguide array and the submicron waveguide can reduce an energy loss generated when an optical signal is transferred from a grating area formed by the waveguide array to an area of the submicron waveguide. An end that is of the submicron waveguide and that is not connected to the first tapered waveguide is connected to an optical device, so that the grating coupler on the chip can be used to input an inputted external optical signal outside a chip into the optical device or output an optical signal in the optical device to outside the chip.

The waveguide array may include at least two different waveguide groups, each waveguide group may include at least one waveguide chain, each waveguide chain may include at least two waveguides that have different widths, waveguides in the waveguide chains included in a same waveguide group have a same width and a same arrangement structure, and waveguides in the waveguide chains included in different waveguide groups have different widths and/or different arrangement structures. Therefore, the grating coupler may include multiple waveguides that have different widths.

In addition, waveguides that have different widths are corresponding to different effective refractive indexes. Therefore, the multiple waveguides that have different widths may be corresponding to multiple different effective refractive indexes, so that multiple coupling center wavelengths and sub-normalized transmission spectra corresponding to the multiple coupling center wavelengths can be generated. Therefore, a total normalized transmission spectrum of the grating coupler is superposition of the sub-normalized transmission spectra of the different coupling center wavelengths generated by the multiple waveguides that have different widths. Compared with a normalized transmission spectrum of a conventional grating coupler usually including waveguides that have only one width (for example, as shown in FIG. 1), a wavelength range of 3 dB in the total normalized transmission spectrum of the grating coupler provided in this embodiment of the present disclosure is significantly increased, and therefore a bandwidth of the grating coupler is effectively increased, and further, an amount of optical signal information that can be transmitted is increased.

Figure 3:
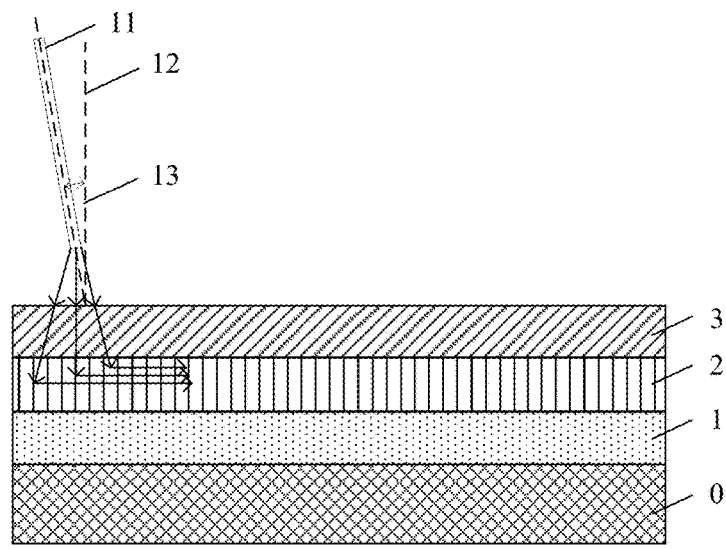
FIG. 3 is a schematic diagram obtained when an optical signal in an optical fiber is coupled using a grating coupler according to an embodiment of the present disclosure.

For example, referring to FIG. 3, an embodiment of the present disclosure provides a schematic diagram obtained when an optical signal in an optical fiber is coupled using a grating coupler. From a bottom layer to a top layer, the grating coupler sequentially includes a substrate layer 0, a lower confining layer 1, a waveguide core layer 2, and an upper confining layer 3. An optical fiber 11 that carries an optical signal is usually located above the upper confining layer of the grating coupler, is correspondingly above a waveguide array in the waveguide core layer, and is close to an end that is of the waveguide array and that is not connected to a first tapered waveguide. An included angle 13 between an axis of the optical fiber and a normal line 12 of a plane on which the grating coupler is located is usually 5° to 15°. The optical signal in the optical fiber arrives at a surface of the waveguide core layer through the transparent upper confining layer in the grating coupler. In this way, the optical signal is coupled into the grating coupler using the waveguide array in the waveguide core layer. It should be noted that in this embodiment of the present disclosure, the optical fiber is merely used as an example for description, and a carrier of a to-be-coupled optical signal is not limited, for example, may further be a fiber bundle or an optical waveguide.

Figure 4:
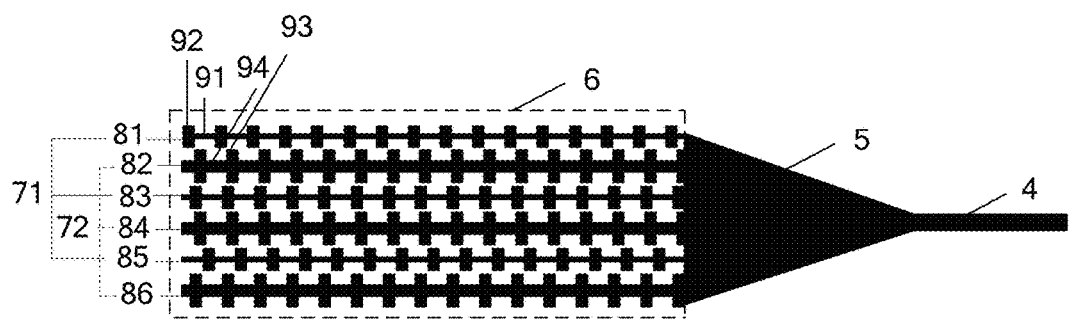
FIG. 4 is a top view of a waveguide core layer of a grating coupler according to an embodiment of the present disclosure.

For example, reference may be made to FIG. 4 for a top view of the waveguide core layer of the grating coupler provided in this embodiment of the present disclosure. The waveguide core layer may include a submicron waveguide 4, a first tapered waveguide 5, and a waveguide array 6. The waveguide array 6 may include a first waveguide group 71 and a second waveguide group 72. The first waveguide group 71 includes a first waveguide chain 81, and the second waveguide group 72 includes a second waveguide chain 82. The first waveguide chain 81 includes a first waveguide 91 and a second waveguide 92 that have different widths, and the second waveguide chain 82 includes a third waveguide 93 and a fourth waveguide 94 that have different widths. In addition, the first waveguide group 71 may further include a third waveguide chain 83 and a fifth waveguide chain 85 whose waveguides have a same width and a same arrangement structure as those of the first waveguide chain 81, and the second waveguide group 72 may further include a fourth waveguide chain 84 and a sixth waveguide chain 86 whose waveguides have a same width and a same arrangement structure as those of the second waveguide chain 82.

Preferably, two adjacent waveguides in a waveguide chain may have different widths, and two adjacent waveguides located in adjacent waveguide chains have different widths. In this way, waveguides that have different widths in the waveguide array can be alternately arranged, so that an area of the waveguide core layer can be utilized as much as possible to reduce area waste. In this way, a structure is more compact, and a quantity of waveguides and a distribution rate of the waveguides in the waveguide core layer are increased, thereby increasing coupling efficiency of the grating coupler.

Figure 5:
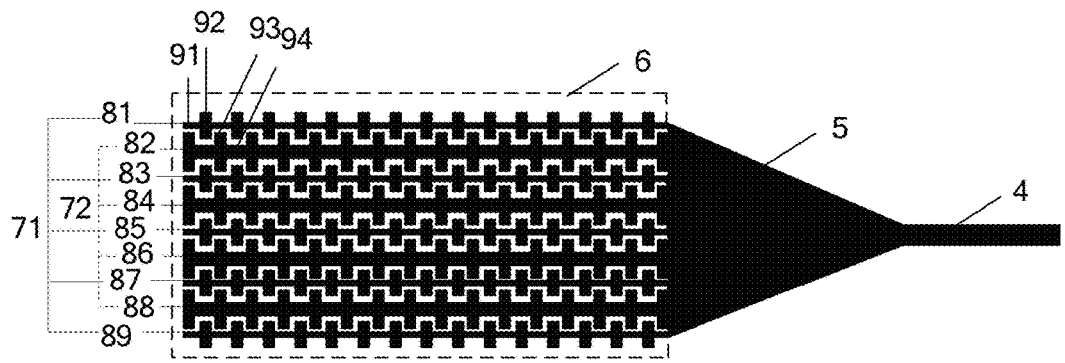
FIG. 5 is a top view of a waveguide core layer of another grating coupler according to an embodiment of the present disclosure.

For example, based on the waveguide core layer with the structure shown in FIG. 4, reference may be made to FIG. 5 for a top view of the waveguide core layer, of the grating coupler, in which the waveguides that have different widths are alternately arranged. The first waveguide 91 and the second waveguide 92 have different widths and are adjacently arranged. The second waveguide chain 82 includes the third waveguide 93 and the fourth waveguide 94, and the third waveguide 93 and the fourth waveguide 94 have different widths and are adjacently arranged. The first waveguide 91 and the third waveguide 93 have different widths and are adjacently arranged. The second waveguide 92 and the fourth waveguide 94 have different widths and are adjacently arranged. In addition, the first waveguide group 71 may further include the third waveguide chain 83, the fifth waveguide chain 85, a seventh waveguide chain 87, and a ninth waveguide chain 89 whose waveguides have a same width and a same arrangement structure as those of the first waveguide chain 81, and the second waveguide group 72 may further include the fourth waveguide chain 84, the sixth waveguide chain 86, and an eighth waveguide chain 88 whose waveguides have a same width and a same arrangement structure as those of the second waveguide chain 82. A width of a wide waveguide (the second waveguide and the third waveguide) in the waveguide array may be 0.2 micrometer (μm) to 1 μm, and a width of a narrow waveguide (the first waveguide and the fourth waveguide) in the waveguide array may be 0.01 μm to 0.2 μm. A length of one cycle in a waveguide chain (a length obtained after one first waveguide is connected to one second waveguide in a horizontal direction, or a length obtained after one third waveguide is connected to one fourth waveguide in the horizontal direction) may be 0.5 μm to 3 μm. It should be noted that, a specific parameter of each component of the grating coupler may be set according to a requirement, and is merely an example for description herein, and a specific range is not limited.

When a center wavelength of an optical signal more approximates to a coupling center wavelength, the grating coupler has higher coupling efficiency for the optical signal. Therefore, to enable the grating coupler to have relatively high coupling efficiency for a to-be-coupled optical signal, a coupling center wavelength of the grating coupler needs to approximate to a center wavelength of the to-be-coupled optical signal. In addition, because a total normalized transmission spectrum of the grating coupler is superposition of sub-normalized transmission spectra corresponding to different coupling center wavelengths respectively generated by multiple waveguides that have different widths, a normalized transmission spectrum of the grating coupler may be decomposed into multiple sub-normalized transmission spectra according to a normalized transmission spectrum superposition principle, and coupling center wavelengths respectively corresponding to the multiple sub-normalized transmission spectra may be set to specified center wavelengths. In this way, coupling center wavelengths respectively corresponding to the multiple waveguides that have different widths approximate respectively to the multiple specified center wavelengths, and a coupling center wavelength corresponding to the total normalized transmission spectrum obtained after superposing the multiple sub-normalized transmission spectra that have different widths can approximate to a center wavelength of the to-be-coupled optical signal, so that the grating coupler has relatively high coupling efficiency for the to-be-coupled optical signal. A waveguide whose coupling center wavelength approximates to a specified center wavelength has relatively high coupling efficiency when transmitting an optical signal that has the specified center wavelength. Waveguides that have different widths and whose coupling center wavelengths respectively approximate to the multiple different specified center wavelengths have relatively high coupling efficiency when transmitting optical signals that have the specified center wavelengths. That a coupling center wavelength approximates to a specified center wavelength may be understood as a difference between the coupling center wavelength and the specified center wavelength is relatively small, and the difference may be set according to an actual requirement.

For any specified center wavelength, coupling efficiency generated when waveguides that have different widths transmit optical signals that have specified center wavelengths and that are in different polarization modes is different. Therefore, for example, waveguide distribution in the waveguide array of the grating coupler may include the following several cases.

Case 1: Waveguides in the waveguide array are all TE polarization-dependent waveguides or are all TM polarization-dependent waveguides.

When coupling efficiency generated when a waveguide transmits an optical signal that has a specified center wavelength and that is in a TE polarization mode is relatively high, for example, is greater than a first preset threshold, the waveguide may be referred to as a TE polarization-dependent waveguide. Herein, the first preset threshold is usually relatively large (for example, may be 85%). A specific value may be set according to an actual requirement, and is not limited herein. Coupling efficiency generated when waveguides that have a same width transmit optical signals that have specified center wavelengths and that are in different polarization modes is different. Therefore, coupling efficiency generated when the TE polarization-dependent waveguide transmits an optical signal that has a specified center wavelength and that is in a TM polarization mode may be relatively high or may be relatively low, that is, the TE polarization-dependent waveguide cannot ensure relatively high coupling efficiency when transmitting the TM polarization mode optical signal that has the specified center wavelength. Similarly, when coupling efficiency generated when a waveguide transmits an optical signal that has a specified center wavelength and that is in the TM polarization mode is relatively high, for example, is greater than the first preset threshold, the waveguide may be referred to as a TM polarization-dependent waveguide. The TM polarization-dependent waveguide cannot ensure relatively high coupling efficiency when transmitting a TE polarization mode optical signal that has a specified center wavelength.

When the waveguides in the grating coupler are all TE polarization-dependent waveguides, because coupling efficiency generated when the TE polarization-dependent waveguides that have different widths separately transmit corresponding optical signals that have a specified center wavelength and that is in the TE polarization mode is relatively high, and coupling center wavelengths of the waveguides that have different widths separately approximate to the specified center wavelengths, in a total normalized transmission spectrum obtained after superposing sub-normalized transmission spectra of multiple waveguides, a coupling center wavelength of the grating coupler approximates to a center wavelength of a to-be-coupled optical signal, so that the grating coupler has relatively high coupling efficiency when transmitting the to-be-coupled optical signal that is in the TE polarization mode. When the waveguides in the grating coupler are all TE polarization-dependent waveguides, the grating coupler may be referred to as a TE polarization-dependent grating coupler.

Similar to a case in which the waveguides in the grating coupler are all TE polarization-dependent waveguides, when the waveguides in the grating coupler are all TM polarization-dependent waveguides, the grating coupler may be referred to as a TM polarization-dependent grating coupler. Coupling efficiency generated when the TM polarization-dependent grating coupler transmits a to-be-coupled optical signal that is in the TM polarization mode is relatively high.

In addition, the foregoing TE/TM polarization-dependent grating coupler includes multiple waveguides that have different widths. Therefore, a total normalized transmission spectrum of the foregoing grating coupler is superposition of sub-normalized transmission spectra of the multiple waveguides that have different widths, and therefore a bandwidth of the grating coupler can be increased.

For example, the TE polarization-dependent grating coupler is used as an example for detailed description herein. In the waveguide core layer shown in FIG. 5, the waveguides in the waveguide array may all be TE polarization-dependent waveguides. A thickness of the waveguide core layer may be 0.2 μm to 0.4 μm, a width of the submicron waveguide may be 0.4 μm to 0.6 μm, a width of a wide end of the first tapered waveguide that is connected to the waveguide array may be 20 μm to 40 μm, a length of the waveguide array may be 20 μm to 40 μm, and a width of the waveguide array may be 20 μm to 30 μm. One cycle of a waveguide chain may include a wide waveguide and a narrow waveguide. A width of the wide waveguide may be 200 nm to 700 nm, and a width of the narrow waveguide may be less than 250 nm. However, specific width values of a wide waveguide in the first waveguide group 71, that is, the second waveguide 92, and a wide waveguide in the second waveguide group 72, that is, the third waveguide 93 may be different, and specific width values of a narrow waveguide in the first waveguide group 71, that is, the first waveguide 91, and a narrow waveguide in the second waveguide group 72, that is, the fourth waveguide 94 may be different. In this way, the waveguide array may include four waveguides that have different widths, and may correspond to four different effective refractive indexes, so that four coupling center wavelengths and a normalized transmission spectrum are generated.

For example, when a center wavelength of a to-be-coupled optical signal is 1550 nm, specified center wavelengths may be respectively set to 1520 nm, 1540 nm, 1560 nm, and 1580 nm. Coupling center wavelengths of the two waveguides that have different widths in the first waveguide group 71 may be respectively 1520 nm and 1540 nm for transmitting an optical signal that is in the TE polarization mode. Coupling efficiency generated when the two waveguides respectively transmit optical signals whose specified center wavelengths are 1520 nm and 1540 nm and that are in the TE polarization mode is highest. A coupling center wavelength corresponding to a normalized transmission spectrum obtained after superposing sub-normalized transmission spectra respectively corresponding to the two coupling center wavelengths is 1530 nm. Coupling center wavelengths of the two waveguides that have different widths in the second waveguide group 72 for transmitting an optical signal that is in the TE polarization mode may be respectively 1560 nm and 1580 nm. Coupling efficiency generated when the two waveguides respectively transmit optical signals whose specified center wavelengths are 1560 nm and 1580 nm and that are in the TE polarization mode is highest. A coupling center wavelength corresponding to a normalized transmission spectrum obtained after superposing sub-normalized transmission spectra respectively corresponding to the two coupling center wavelengths is 1570 nm. A total normalized transmission spectrum of the grating coupler shown in FIG. 6 may be obtained after superposing the sub-normalized transmission spectra respectively corresponding to the four coupling center wavelengths. Reference may be made to FIG. 7 for a schematic diagram of a coupling effect of the grating coupler for an optical signal whose center wavelength is 1550 nm. It should be noted that a parameter value herein is merely an example for description, and this embodiment of the present disclosure sets no limitation thereto.

Figure 6:
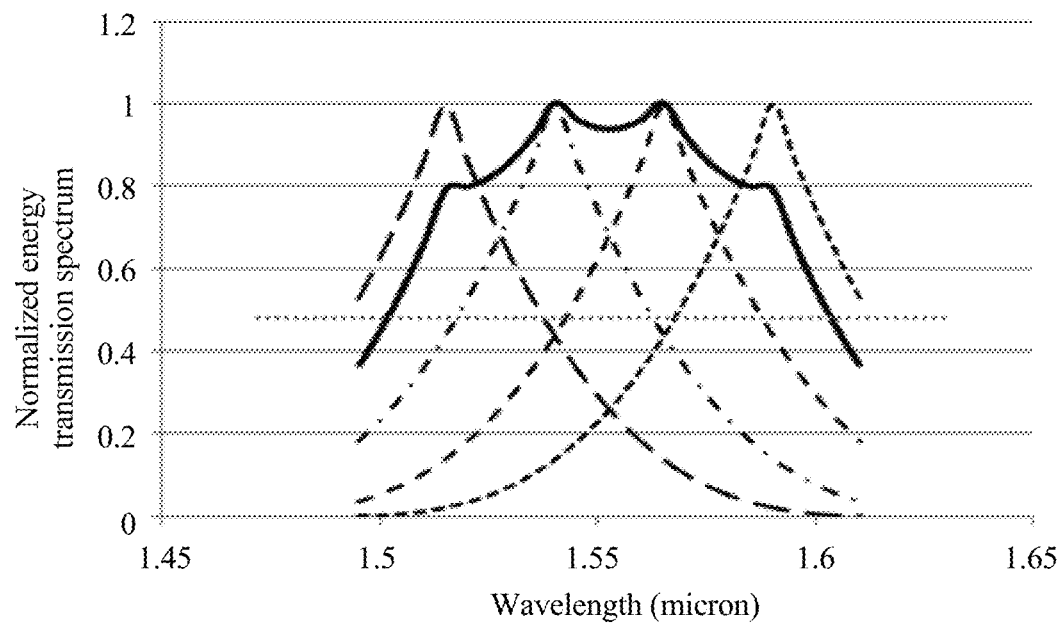
FIG. 6 is a normalized transmission spectrum of a grating coupler according to an embodiment of the present disclosure.
Figure 7:
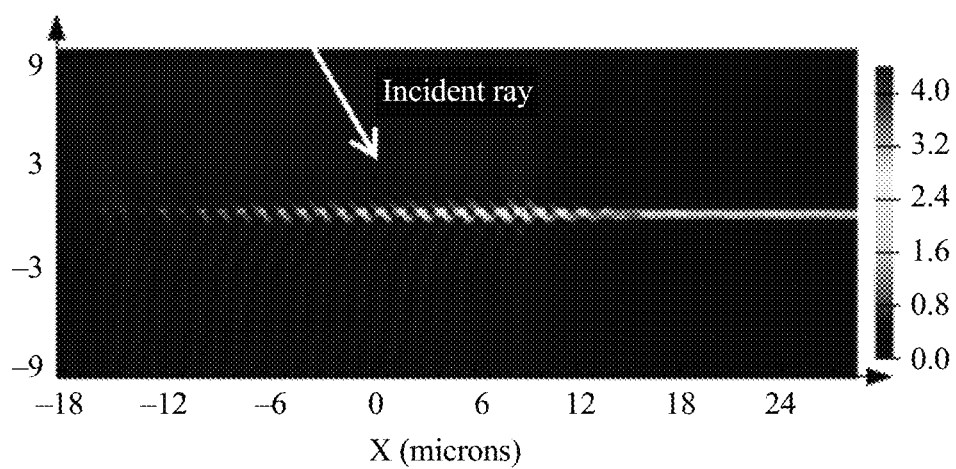
FIG. 7 is a schematic diagram of a coupling effect of a grating coupler for an optical signal according to an embodiment of the present disclosure.

It can be learned from FIG. 6 that a coupling center wavelength of the grating coupler for transmitting an optical signal that is in the TE polarization mode is 1550 nm, and is consistent with the center wavelength of the to-be-coupled optical signal. Therefore, coupling efficiency of transmitting the to-be-coupled optical signal that is in the TE polarization mode is highest. In addition, in FIG. 6, a bandwidth of 3 dB of the total normalized transmission spectrum of the grating coupler is corresponding to a wavelength range about 100 nm, that is, a bandwidth of the TE polarization-dependent grating coupler is increased to about 12.5 THz. Therefore, compared with the prior art, the TE polarization-dependent grating coupler provided in this embodiment of the present disclosure can significantly increase a bandwidth for transmitting an optical signal that has a specified center wavelength and that is in the TE polarization mode, and further significantly increase an amount of optical signal information that can be transmitted.

Similar to the TE polarization-dependent grating coupler, the TM polarization-dependent grating coupler can increase coupling efficiency of and a bandwidth for transmitting an optical signal that has a specified center wavelength and that is in the TM polarization mode.

The TE polarization-dependent grating coupler can ensure relatively high coupling efficiency when transmitting an optical signal that has a specified center wavelength and that is in the TE polarization mode, but cannot ensure relatively high coupling efficiency when transmitting an optical signal that has a specified center wavelength and that is in the TM polarization mode. Therefore, the TE polarization-dependent grating coupler has relatively strong polarization dependency. When a coupling center wavelength of a TE polarization-dependent grating coupler for transmitting a TE polarization-dependent optical signal is 1550 nm, a coupling center wavelength of the waveguide for transmitting an optical signal that is in the TM polarization mode is 1556 nm, instead of 1550 nm. If a center wavelength of a to-be-coupled optical signal is 1550 nm, coupling efficiency generated when the grating coupler transmits an optical signal that is in the TE polarization mode is high, and coupling efficiency generated when the grating coupler transmits an optical signal that is in the TM polarization mode is relatively low. Therefore, a coupling efficiency difference generated when the grating coupler transmits an optical signal that has a specified center wavelength and that is in the TE mode and an optical signal that has a specified center wavelength and that is the TM polarization mode is relatively great, and consequently, a polarization-dependent loss (PDL) is relatively large. For any specified center wavelength, the PDL herein refers to a ratio, of higher coupling efficiency to lower coupling efficiency, generated when the optical signal that has the specified center wavelength and that is in the TE mode and the optical signal that has the specified center wavelength and that is the TM polarization mode are transmitted. Similarly, the TM polarization-dependent grating coupler has relatively high coupling efficiency when transmitting an optical signal that has a specified center wavelength and that is in the TM polarization mode, but cannot ensure relatively high coupling efficiency when transmitting an optical signal that has a specified center wavelength and that is in the TE polarization mode.

In addition, a to-be-coupled optical signal is usually not an optical signal that is fully in the TE polarization mode or an optical signal that is fully in the TM polarization mode, and may generally be decomposed into a TE polarization component and a TM polarization component that are mutually orthogonal. In addition, the TE/TM polarization-dependent grating coupler can only ensure relatively high coupling efficiency for an optical signal of only one polarization component, and cannot ensure relatively high coupling efficiency for the other polarization component, that is, a PDL is relatively large. Therefore, the TE/TM polarization-dependent grating coupler has relatively low total coupling efficiency for an optical signal.

Case 2: Waveguides in the waveguide array may include a TE polarization-dependent waveguide and a TM polarization-dependent waveguide. Coupling efficiency generated when the TE polarization-dependent waveguide transmits an optical signal that has a specified center wavelength and that is in a TE polarization mode is greater than a first preset threshold, and coupling efficiency generated when the TM polarization-dependent waveguide transmits an optical signal that has a specified center wavelength and that is in a TM polarization mode is greater than the first preset threshold.

It can be learned from case 1 that, when waveguides that have different widths in the waveguide array of the grating coupler include the TE polarization-dependent waveguide, coupling efficiency of and a bandwidth for transmitting, by the grating coupler, an optical signal that has a specified center wavelength and that is in the TE polarization mode can be increased. When the waveguides that have different widths in the waveguide array of the grating coupler include the TM polarization-dependent waveguide, coupling efficiency of and a bandwidth for transmitting, by the grating coupler, a TM polarization-dependent optical signal that has a specified center wavelength can be increased. Therefore, in case 2, when the waveguides that have different widths in the waveguide array of the grating coupler include both the TE polarization-dependent waveguide and the TM polarization-dependent waveguide, both the coupling efficiency of and the bandwidth for transmitting, by the grating coupler, the optical signal that has the specified center wavelength and that is in the TE polarization mode and the coupling efficiency of and the bandwidth for transmitting, by the grating coupler, the TM polarization-dependent optical signal that has the specified center wavelength can be increased. In addition, when an optical signal includes a TE polarization component and a TM polarization component, the grating coupler can increase total coupling efficiency of and a total bandwidth for transmitting an optical signal that has a specified center wavelength.

It can be learned that, the grating coupler in case 2 can increase a coupling bandwidth for and coupling efficiency of transmitting an optical signal that has a specified center wavelength, and is independent of a polarization mode. Therefore, the grating coupler in case 2 may be referred to as a polarization-independent grating coupler.

In the polarization-independent grating coupler provided in case 2, quantities and positions of the TE polarization-dependent waveguides and TM polarization-dependent waveguides in the waveguide array are not specifically limited in this embodiment of the present disclosure. For example, waveguides in some waveguide groups may be TE polarization-dependent waveguides, and waveguides in the other waveguide groups may be TM polarization-dependent waveguides. Alternatively, some waveguides in any waveguide chain may be TE polarization-dependent waveguides, and a remaining waveguide may be a TM polarization-dependent waveguide.

Optionally, a waveguide chain in the waveguide array is a TE polarization-dependent waveguide chain or a TM polarization-dependent waveguide chain, and the TE polarization-dependent waveguide chain and the TM polarization-dependent waveguide chain are adjacently arranged. Waveguides in the TE polarization-dependent waveguide chain are all TE polarization-dependent waveguides, and waveguides in the TM polarization-dependent waveguide chain are all TM polarization-dependent waveguides. For example, reference may be made to FIG. 8 for a top view of a waveguide core layer of the polarization-independent grating coupler provided in this embodiment of the present disclosure. The waveguide array 6 includes a third waveguide group 73, a fourth waveguide group 74, a fifth waveguide group 75, and a sixth waveguide group 76. Each waveguide group includes two waveguide chains. Waveguides filled by slashes are TM polarization-dependent waveguides, and the other waveguides are TE polarization-dependent waveguides.

Figure 9:
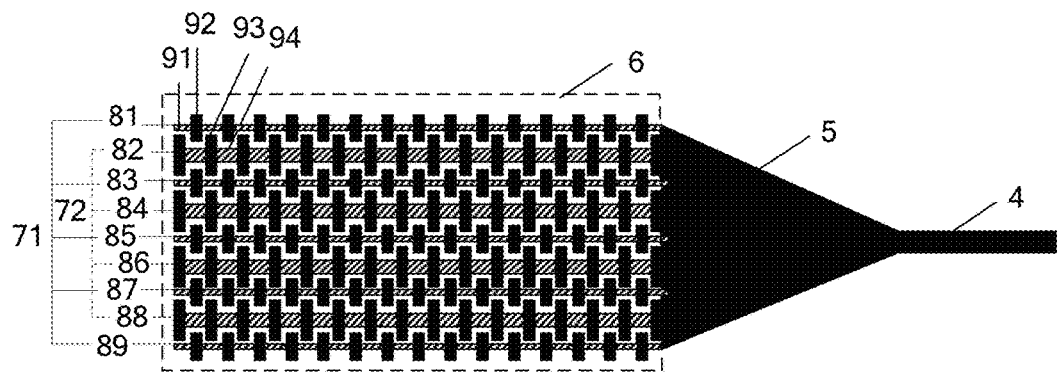
FIG. 9 is a top view of a waveguide core layer of another grating coupler according to an embodiment of the present disclosure.

Preferably, the TE polarization-dependent waveguide and the TM polarization-dependent waveguide are adjacently arranged in the waveguide array. In any waveguide chain, the TE polarization-dependent waveguide and the TM polarization-dependent waveguide may be adjacently arranged, and two adjacent waveguides located in adjacent waveguide chains may be respectively the TE polarization-dependent waveguide and the TM polarization-dependent waveguide. For example, in the waveguide array shown in FIG. 5, the first waveguide and the fourth waveguide may be TM polarization-dependent waveguides, and the second waveguide and the third waveguide may be TE polarization-dependent waveguides. For details, reference may be made to a structure of the waveguide core layer shown in FIG. 9. Waveguides filled by slashes are TM polarization-dependent waveguides, and the other waveguides are TE polarization-dependent waveguides. In the first waveguide chain, the first waveguide and the second waveguide that are adjacently arranged are respectively a TM polarization-dependent waveguide and a TE polarization-dependent waveguide. In the second waveguide chain, the third waveguide and the fourth waveguide that are adjacently arranged are respectively a TE polarization-dependent waveguide and a TM polarization-dependent waveguide. The first waveguide in the first waveguide chain and the third waveguide in the second waveguide chain are adjacent to each other and are respectively a TM polarization-dependent waveguide and a TE polarization-dependent waveguide. The second waveguide in the first waveguide chain and the fourth waveguide in the second waveguide chain are adjacent to each other and are respectively a TE polarization-dependent waveguide and a TM polarization-dependent waveguide.

An optical signal may be usually decomposed into an optical signal that is in the TE polarization mode and an optical signal that is in the TM polarization mode, and a flare of an optical signal coupled using the grating coupler is small; therefore, a flare area corresponding to the grating coupler is small. When a TE polarization-dependent waveguide and a TM polarization-dependent waveguide are adjacently arranged, the grating coupler can include both multiple TE polarization-dependent waveguides and multiple TM polarization-dependent waveguides in the corresponding flare area. In this way, the TE polarization component in the optical signal may be coupled into the grating coupler by the multiple TE polarization-dependent waveguides, and the TM polarization component may be coupled into the grating coupler by the multiple TM polarization-dependent waveguides that are adjacent to the TE polarization-dependent waveguides, so as to increase coupling efficiency of the grating coupler for the optical signal.

Case 3: Waveguides in the waveguide array include polarization-independent waveguides, and a polarization-dependent loss generated when the polarization-independent waveguide transmits an optical signal that has a specified center wavelength and that is in a TE polarization mode and transmits an optical signal that has a specified center wavelength and that is in a TM polarization mode is less than a second preset threshold.

The second preset threshold is usually relatively small (for example, may be 0.1 dB). A specific value may be set according to an actual situation, and is not limited herein. The PDL is less than the second preset threshold, that is, the PDL is small, so that coupling efficiency generated when the polarization-independent waveguide transmits the optical signal that has the specified center wavelength and that is in the TE polarization mode approximates to coupling efficiency generated when the polarization-independent waveguide transmits the optical signal that has the specified center wavelength and that is in the TM polarization mode, that is, a polarization mode has small impact on coupling efficiency of the polarization-independent waveguide.

Further, the coupling efficiency generated when the polarization-independent waveguide transmits the optical signal that has the specified center wavelength and that is in the TE polarization mode is greater than a third preset threshold, and the coupling efficiency generated when the polarization-independent waveguide transmits the optical signal that has the specified center wavelength and that is in the TM polarization mode is greater than the third preset threshold. The third preset threshold herein is relatively large (for example, may be 80%), and may be usually less than the first preset threshold. That is, the polarization-independent waveguide can ensure relatively high coupling efficiency of transmitting the optical signal that has the specified center wavelength and that is in the TE polarization mode, and can also ensure relatively high coupling efficiency of transmitting the optical signal that has the specified center wavelength and that is in the TM polarization mode. In addition, when an optical signal includes a TE polarization component and a TM polarization component, the polarization-independent waveguide may have relatively high coupling efficiency for both polarization components. Therefore, with multiple polarization-independent waveguides included, a grating coupler can increase coupling efficiency of transmitting an optical signal, and is independent of a polarization mode of the optical signal, and therefore the grating coupler may be a polarization-independent grating coupler.

In addition, when a waveguide with any width transmits an optical signal that is in the TE polarization mode, a coupling center wavelength and a sub-normalized transmission spectrum that are corresponding to the TE polarization mode may be generated. When the waveguide transmits an optical signal that is in the TM polarization mode, a coupling center wavelength and a sub-normalized transmission spectrum that are corresponding to the TM polarization mode may be further generated. Therefore, a normalized transmission spectrum, of the TE polarization mode, corresponding to the grating coupler is superposition of sub-normalized transmission spectra generated by multiple polarization-independent waveguides that have different widths. In addition, a normalized transmission spectrum, of the TM polarization mode, corresponding to the grating coupler is also superposition of sub-normalized transmission spectra generated by multiple polarization-independent waveguides that have different widths. Therefore, regardless of whether an optical signal is in the TE polarization mode or in the TM polarization mode, the grating coupler provided in this embodiment of the present disclosure can increase a coupling bandwidth for an optical signal, and further increase an amount of optical signal information that can be transmitted.

It can be learned that, the grating coupler provided in case 3 can increase a coupling bandwidth and coupling efficiency for an optical signal, and is not limited by a polarization mode of the optical signal. Therefore, the grating coupler provided in case 3 may also be referred to as a polarization-independent grating coupler.

Figure 10:
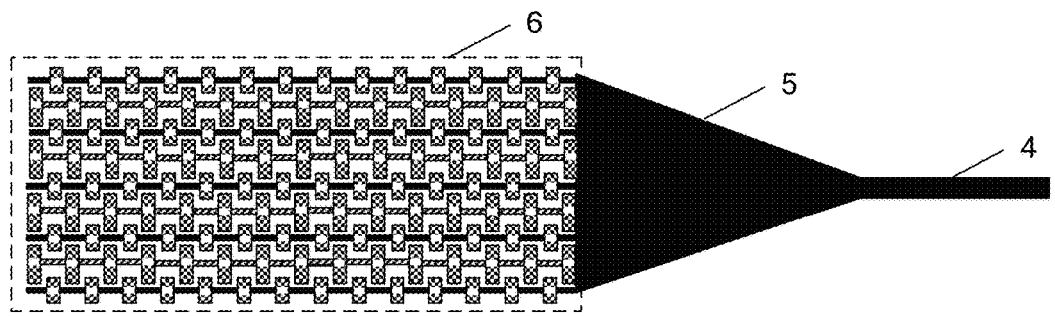
FIG. 10 is a top view of a waveguide core layer of still another grating coupler according to an embodiment of the present disclosure.

For example, reference may be made to FIG. 10 for a top view of the polarization-independent grating coupler provided in this embodiment of the present disclosure. Slot waveguides filled by grids are polarization-independent waveguides, symmetric waveguides filled by slashes are TM polarization-dependent waveguides, and the other waveguides are TE polarization-dependent waveguides. Certainly, the waveguides other than the polarization-independent waveguides may all be TE polarization-dependent waveguides or may all be TM polarization-dependent waveguides. A quantity and positions of the polarization-independent waveguides in the grating coupler are not limited in this embodiment of the present disclosure.

Preferably, the waveguides in the waveguide array may all be polarization-independent waveguides. In this case, any waveguide in the waveguide array may be used to enable relatively high coupling efficiency for optical signals that are in the TE polarization mode and the TM polarization mode, so as to better increase coupling efficiency for an optical signal.

Figure 11:
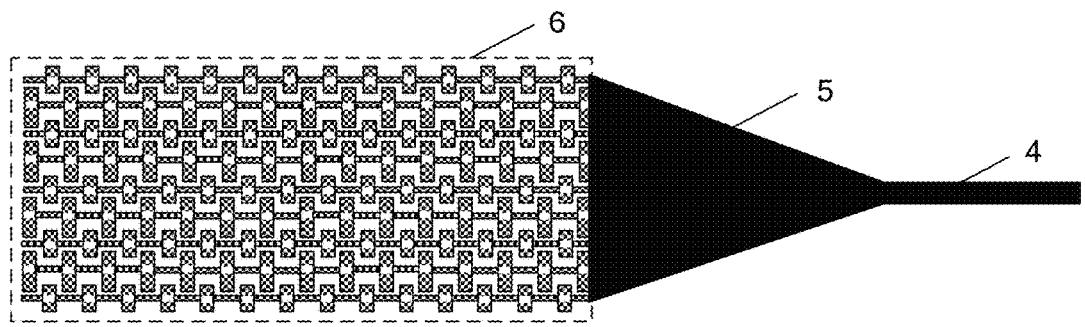
FIG. 11 is a top view of a waveguide core layer of yet another grating coupler according to an embodiment of the present disclosure.
Figure 12:
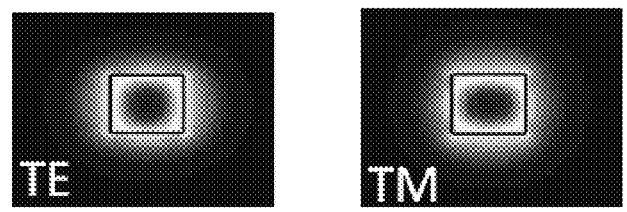
FIG. 12 is a diagram of mode field distribution, of TE and TM polarization modes, corresponding to a polarization-independent symmetric waveguide according to an embodiment of the present disclosure.
Figure 13:
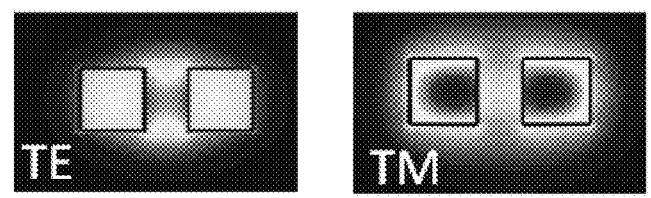
FIG. 13 is a diagram of mode field distribution, of TE and TM polarization modes, corresponding to a polarization-independent slot waveguide according to an embodiment of the present disclosure.

For example, reference may be made to FIG. 11 for a top view of the waveguide core layer of the polarization-independent grating coupler provided in this embodiment of the present disclosure. Both slot waveguides filled by grids and symmetric waveguides filled by grids are polarization-independent waveguides. A thickness of the waveguide core layer may be 220 nm. The waveguide array may include two waveguide groups. One cycle in any waveguide chain may include two waveguides that have different widths. A wide waveguide may be a polarization-independent slot waveguide, and a narrow waveguide may be a polarization-independent symmetric waveguide. A width of the narrow waveguide may be about 220 nm, so that an effective refractive index of the narrow waveguide in the TE polarization mode approximates to an effective refractive index of the narrow waveguide in the TM polarization mode, and a difference between coupling center wavelengths, in the TE and TM polarization modes, respectively corresponding to the two effective refractive indexes is within a preset threshold. For example, reference may be made to FIG. 12 for mode field distribution, of the TE polarization mode and the TM polarization mode, corresponding to a polarization-independent symmetric waveguide within the width range. A width of the slot waveguide may be about 400 nm, and a width of a slot may be about 100 nm, so that an effective refractive index corresponding to the slot waveguide in the TE polarization mode approximates to an effective refractive index corresponding to the slot waveguide in the TM polarization mode, and a difference between coupling center wavelengths in the respectively corresponding TE/TM polarization modes is within a preset threshold. For example, reference may be made to FIG. 13 for mode field distribution, of the TE polarization mode and the TM polarization mode, corresponding to a polarization-independent slot waveguide within the foregoing width range. Certainly, a specific width value of a waveguide may be set according to a requirement, and is not limited herein.

Figure 14:
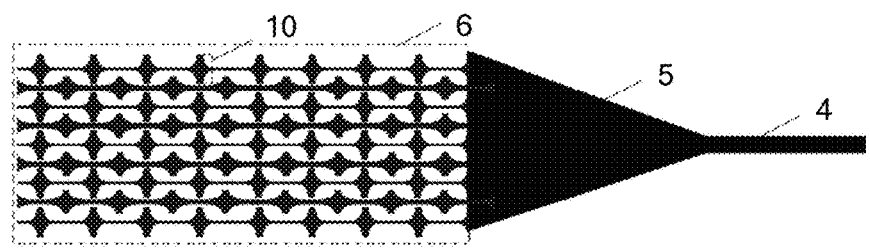
FIG. 14 is a top view of a waveguide core layer of another grating coupler according to an embodiment of the present disclosure.

Further, based on the foregoing grating couplers provided in case 1, case 2, and case 3, the waveguide array may further include a second tapered waveguide configured to connect waveguides that have different widths in a waveguide chain, so as to reduce an energy loss generated when an optical signal is transferred from one waveguide to another waveguide that has a different width. For example, reference may be made to FIG. 14 for a top view of a waveguide core layer that includes a second tapered waveguide 10.

Figure 15:
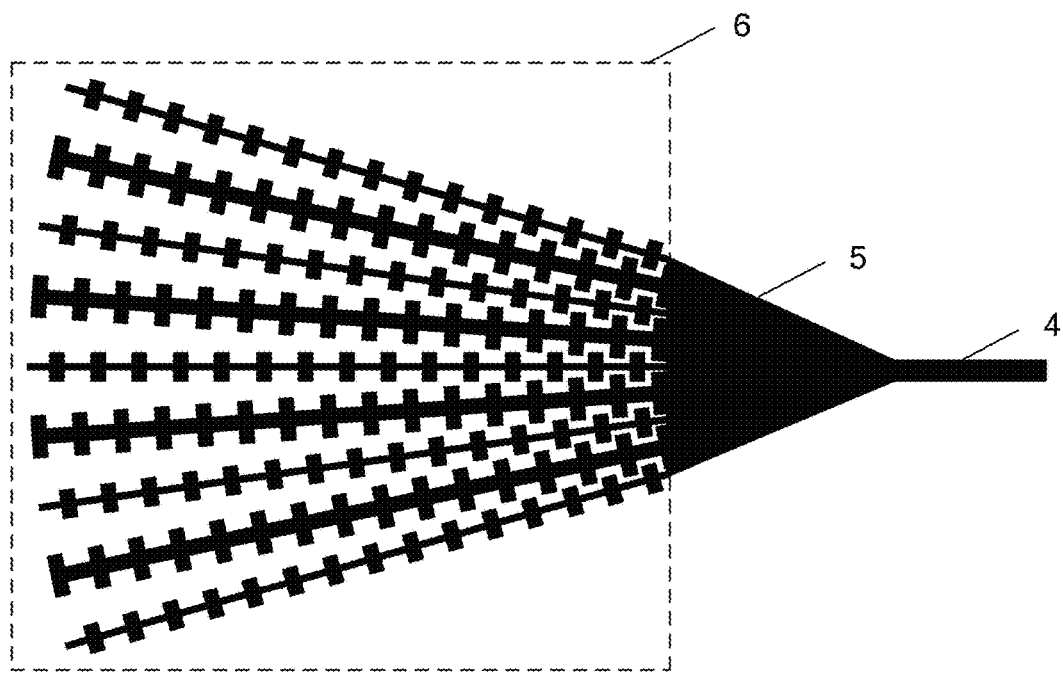
FIG. 15 is a top view of a waveguide core layer of still another grating coupler according to an embodiment of the present disclosure.

In the foregoing grating coupler, the waveguide chains in the waveguide array may be arranged in parallel, or the waveguide chains may further be arranged at a specific angle to form a sector ring waveguide array. When the waveguide chains are arranged at a specific angle to form a sector ring waveguide array and are then connected to the first tapered waveguide, a length of the first tapered waveguide can be reduced, thereby reducing an area occupied by the first tapered waveguide. For example, reference may be made to FIG. 15 for a top view of a waveguide core layer of a grating coupler that includes a sector ring waveguide array. A length of the sector ring waveguide array may be 10 μm to 15 μm, and a radius of the sector ring waveguide array may be 10 μm to 30 μm.

Figure 8:
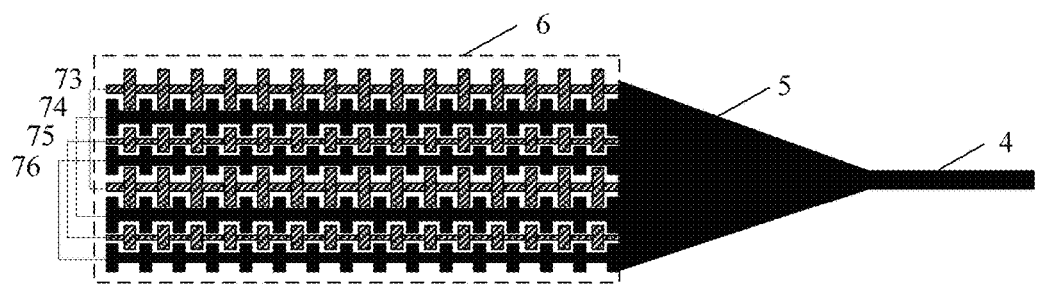
FIG. 8 is a top view of a waveguide core layer of still another grating coupler according to an embodiment of the present disclosure.

It should be noted that the waveguide array may also include at least two waveguide groups, for example, the waveguide array shown in FIG. 8 includes four waveguide groups. In addition, any cycle of a waveguide chain may include at least two waveguides, and this is not limited in this embodiment of the present disclosure.

In the foregoing grating coupler, a waveguide in the waveguide array may be a strip waveguide, a ridge waveguide, a slot waveguide, or a waveguide of another type, and this is not limited herein. In addition, a submicron waveguide in the foregoing grating coupler may be a strip waveguide, a ridge waveguide, a slot waveguide, or a waveguide of another type.

In addition, in the foregoing grating coupler, a distributed Bragg reflector (DBR) or a metal reflection layer may exist on a surface of the substrate layer that does not contact with the lower confining layer, so as to increase a reflectivity of an optical signal inside the grating coupler at the substrate layer, and avoid leakage of an optical signal from the substrate layer of the grating coupler, thereby increasing coupling efficiency of the grating coupler.

In addition, in the foregoing grating coupler, a polycrystalline silicon layer may further cover an incident surface of an optical signal, so as to reduce signal reflection of an external optical signal on the incident surface of the grating coupler, and increase an optical signal that can be diffracted into the grating coupler, thereby increasing the coupling efficiency of the grating coupler.

Certainly, based on the foregoing grating coupler, a refractive index matching liquid or another related technology in the prior art field may further be combined to increase the coupling efficiency of the grating coupler, and this is not limited in this embodiment of the present disclosure.

It should be noted that a parameter value of each part of the grating coupler provided in this embodiment of the present disclosure is merely an example for description. A specific value may be set according to an actual situation, and is not limited in this embodiment of the present disclosure.

This embodiment of the present disclosure provides the grating coupler. A waveguide array of a waveguide core layer in the grating coupler includes at least two waveguide groups, each waveguide group includes at least one waveguide chain, and each waveguide chain includes at least two waveguides that have different widths. Therefore, the grating coupler may include multiple waveguides that have different widths, and may correspond to multiple different effective refractive indexes, so that multiple coupling center wavelengths and sub-normalized transmission spectrum can be generated. Therefore, a total normalized transmission spectrum of the grating coupler is superposition of sub-normalized transmission spectra of the multiple waveguides that have different widths. Compared with a normalized transmission spectrum of a conventional grating coupler usually including waveguides that have only one width, the grating coupler provided in the embodiments of the present disclosure can significantly increase a bandwidth, so as to resolve a problem in the prior art that a bandwidth of the conventional grating coupler is low.

Figure 16:
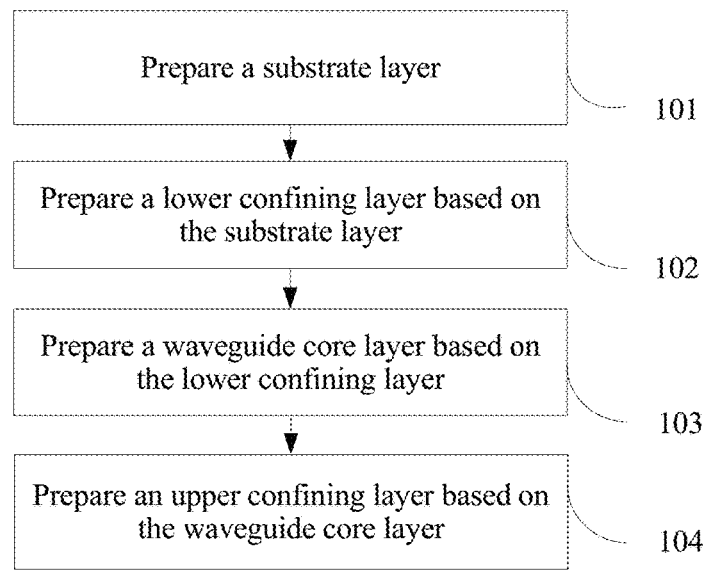
FIG. 16 is a flowchart of a grating coupler preparation method according to an embodiment of the present disclosure.

An embodiment of the present disclosure provides a grating coupler preparation method. Referring to FIG. 16, main steps of the method may include the following steps.

101. Prepare a substrate layer.

102. Prepare a lower confining layer based on the substrate layer.

103. Prepare a waveguide core layer based on the lower confining layer.

The waveguide core layer includes a submicron waveguide, a first tapered waveguide, and a waveguide array, the waveguide array includes at least two waveguide groups, the waveguide group includes at least one waveguide chain, the waveguide chain includes at least two waveguides that have different widths, the waveguides in the waveguide chain are connected to each other, waveguides in the waveguide chains included in a same waveguide group have a same width and a same arrangement structure, and waveguides in the waveguide chains included in different waveguide groups have different widths and/or different arrangement structures. An end of the waveguide chain in the waveguide array is connected to a wide end of the first tapered waveguide, and a narrow end of the first tapered waveguide is connected to the submicron waveguide.

104. Prepare an upper confining layer based on the waveguide core layer.

In a grating coupler obtained using the foregoing preparation steps, the waveguide array may include at least two different waveguide groups, each waveguide group may include at least one waveguide chain, each waveguide chain may include at least two waveguides that have different widths, waveguides in the waveguide chains included in a same waveguide group have a same width and a same arrangement structure, and waveguides in the waveguide chains included in different waveguide groups have different widths and/or different arrangement structures. Therefore, the grating coupler may include multiple waveguides that have different widths. Waveguides that have different widths are corresponding to different effective refractive indexes of optical signals. Therefore, the multiple waveguides that have different widths may be corresponding to multiple different effective refractive indexes, so that multiple coupling center wavelengths and sub-normalized transmission spectrum corresponding to the multiple coupling center wavelengths can be generated. Therefore, a total normalized transmission spectrum of the grating coupler is superposition of sub-normalized transmission spectra corresponding to the different coupling center wavelengths generated by the multiple waveguides that have different widths. Compared with a normalized transmission spectrum of a conventional grating coupler usually including waveguides that have only one width (for example, as shown in FIG. 1), a wavelength range of 3 dB in the total normalized transmission spectrum of the grating coupler provided in this embodiment of the present disclosure is significantly increased, and therefore a bandwidth of the grating coupler is effectively increased, and further, an amount of optical signal information that can be transmitted is increased.

Figure 17:
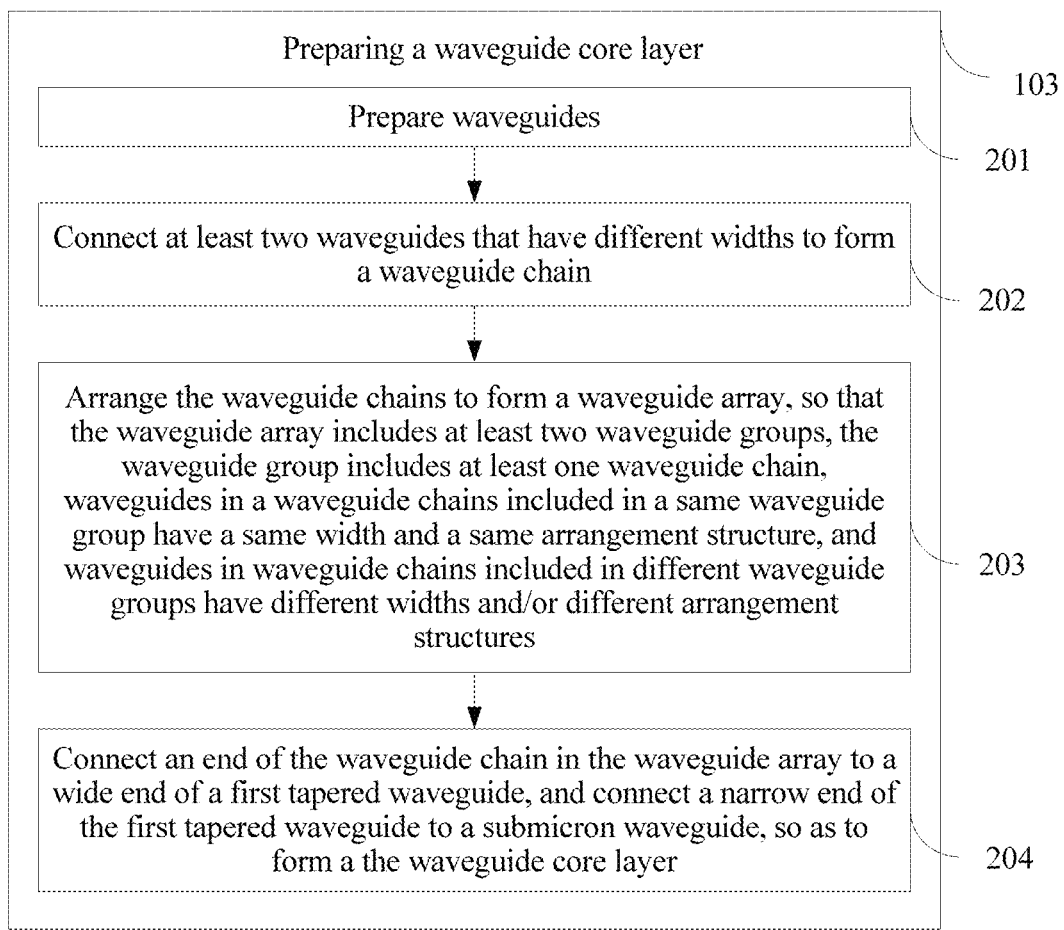
FIG. 17 is a flowchart of a method for preparing a waveguide core layer of a grating coupler according to an embodiment of the present disclosure.

Referring to FIG. 17, the preparing a waveguide core layer based on the lower confining layer in step 103 may include steps 201 to 204.

201. Prepare waveguides.

A to-be-coupled optical signal is usually an optical signal with a center wavelength commonly used in communication, for example, 1550 nm. When the waveguides are prepared, a specified center wavelength may be set according to the center wavelength of the to-be-coupled optical signal. The specified center wavelength usually approximates to the center wavelength of the to-be-coupled optical signal. When a coupling center wavelength of a waveguide approximates to a preset specified center wavelength, a coupling center wavelength corresponding to a normalized transmission spectrum obtained after superposing sub-normalized transmission spectra of multiple waveguides that have different widths approximates to the center wavelength of the to-be-coupled optical signal. In this case, the grating coupler has relatively high coupling efficiency when transmitting the to-be-coupled optical signal. For example, when the center wavelength of the to-be-coupled optical signal is 1550 nm, specified center wavelengths may be 1520 nm, 1540 nm, 1560 nm, and 1570 nm. A width set of waveguides that make a difference between the coupling center wavelength and each of the specified center wavelengths fall within a specific difference range (the difference range is usually small) is determined according to the specified center wavelengths. When a specified center wavelength more approximates to the coupling center wavelength, coupling efficiency is higher. Therefore, when the coupling center wavelength approximates to the specified center wavelength, coupling efficiency of the waveguide for an optical signal with the specified center wavelength is relatively high. Waveguides that have different widths are prepared according to different width values in the width set, so that the grating coupler includes multiple waveguides that have different widths, and a normalized transmission spectrum of the grating coupler is superposition of sub-normalized transmission spectra of the multiple waveguides that have different widths, thereby effectively increasing a bandwidth.

The waveguide prepared in this step may be a strip waveguide, a ridge waveguide, a slot waveguide, or a waveguide of another type, and this is not limited herein.

202. Connect at least two waveguides that have different widths to form a waveguide chain.

This step enables the waveguide chain to include multiple waveguides that have different widths. The waveguides that have different widths may be cyclically arranged or may be pseudo-cyclically arranged, and this is not limited herein.

203. Arrange the waveguide chains to form a waveguide array, so that the waveguide array includes at least two waveguide groups, the waveguide group includes at least one waveguide chain, waveguides in waveguide chains included in a same waveguide group have a same width and a same arrangement structure, and waveguides in waveguide chains included in different waveguide groups have different widths and/or different arrangement structures.

The waveguide array formed by arranging the waveguide chains forms a grating. The grating herein may be a uniform grating or may be a non-uniform grating. A to-be-coupled optical signal may be coupled using a grating and a diffraction feature. The waveguide chains in the waveguide array may be arranged in parallel, or may be arranged at a specific angle to form a sector ring waveguide array, so as to reduce a length of the first tapered waveguide that is connected to the waveguide chain, and reduce an area occupied by the first tapered waveguide.

204. Connect an end of the waveguide chain in the waveguide array to a wide end of a first tapered waveguide, and connect a narrow end of the first tapered waveguide to a submicron waveguide, so as to form the waveguide core layer.

Further, two adjacent waveguides in a waveguide chain in the waveguide array may have different widths, and two adjacent waveguides located in adjacent waveguide chains may have different widths. In step 202 and step 203, the waveguides that have different widths may be alternately arranged, so that an area of the waveguide core layer can be utilized as much as possible to reduce area waste. In this way, a structure is more compact, and a quantity of waveguides and a distribution rate of waveguides in the waveguide core layer are increased, thereby increasing coupling efficiency of the grating coupler.

The foregoing step 201 may include the following.

301. Determine, according to a grating equation, an effective refractive index set corresponding to a specified center wavelength.

The grating equation indicates a correspondence between a coupling center wavelength and an effective refractive index. Therefore, the effective refractive index set corresponding to the specified center wavelength may be determined according to the grating equation.

302. Determine a width set of the waveguides according to the effective refractive index set, and prepare the waveguides according to the width set of the waveguides.

Optical signals in different polarization modes have different characteristics, border conditions, and other factors. Therefore, waveguides that have a same width are corresponding to different effective refractive indexes in different polarization modes, that is, in different polarization modes, waveguides corresponding to a same effective refractive index have different widths. Therefore, step 302 may include two cases: steps 401 to 402 and steps 501 to 502.

401. In a TE polarization mode, determine a width set of TE polarization-dependent waveguides according to the effective refractive index set. Coupling efficiency generated when the TE polarization-dependent waveguide transmits an optical signal that has a specified center wavelength and that is in the TE polarization mode is greater than a first preset threshold. For specific description of the TE polarization-dependent waveguide, reference may be made to the apparatus embodiment.

402. Prepare the TE polarization-dependent waveguides according to the width set of the TE polarization-dependent waveguides.

In step 401, after the width set of the TE polarization-dependent waveguides is determined, a TE polarization-dependent waveguide with a corresponding width may be prepared according to a width value in the width set of the TE polarization-dependent waveguides, so that the waveguide array includes multiple TE polarization-dependent waveguides that have different widths, and a normalized transmission spectrum of the grating coupler is superposition of sub-normalized transmission spectra of the multiple TE polarization-dependent waveguides that have different widths. In this way, a coupling bandwidth for a TE polarization optical signal in a preset wavelength range can be significantly increased, and an amount of TE polarization optical signal information that can be transmitted is effectively increased.

Alternatively, step 302 may include the following.

501. In a TM polarization mode, determine a width set of TM polarization-dependent waveguides according to the effective refractive index set. Coupling efficiency generated when the TM polarization-dependent waveguide transmits an optical signal that has a specified center wavelength and that is in the TM polarization mode is greater than a first preset threshold. For specific description of the TM polarization-dependent waveguide, reference may be made to the apparatus embodiment.

502. Prepare the TM polarization-dependent waveguides according to the width set of the TM polarization-dependent waveguides.

In step 501, after the width set of the TM polarization-dependent waveguides is determined, a TM polarization-dependent waveguide with a corresponding width may be prepared according to a width value in the width set of the TM polarization-dependent waveguides, so that the waveguide array includes multiple TM polarization-dependent waveguides that have different widths, and a normalized transmission spectrum of the grating coupler is superposition of sub-normalized transmission spectra of the multiple TM polarization-dependent waveguides that have different widths. In this way, a coupling bandwidth for a TM polarization optical signal in a preset wavelength range can be significantly increased, and an amount of TM polarization optical signal information that can be transmitted is effectively increased.

Optionally, waveguides in the waveguide array include a TE polarization-dependent waveguide and a TM polarization-dependent waveguide. The waveguide array may include both the TE polarization-dependent waveguides that have different widths obtained in steps 401 and 402 and the TM polarization-dependent waveguides that have different widths obtained in steps 501 and 502, so as to increase a coupling bandwidth and coupling efficiency of the grating coupler, and an amount of optical signal information that can be transmitted. For details, reference may be made to description in the apparatus embodiment. Furthermore, the TE polarization-dependent waveguides and the TM polarization-dependent waveguides may be alternately arranged in the waveguide array, so as to better increase the coupling efficiency of the grating coupler. For details, reference may be made to description in the apparatus embodiment.

Optionally, waveguides in the waveguide array include polarization-independent waveguides, and a PDL generated when the polarization-independent waveguide transmits an optical signal that has a specified center wavelength and that is in the TE polarization mode and transmits an optical signal that has a specified center wavelength and that is in the TM polarization mode is less than a second preset threshold. Further, coupling efficiency generated when the polarization-independent waveguide transmits the optical signal that has the specified center wavelength and that is in the TE polarization mode is greater than a third preset threshold, and coupling efficiency generated when the polarization-independent waveguide transmits the optical signal that has the specified center wavelength and that is in the TM polarization mode is greater than the third preset threshold. The preparing polarization-independent waveguides in step 201 may include the following steps.

601. Determine a first mapping relationship according to a grating equation and a correspondence between an effective refractive index in the TE polarization mode and a width of a TE polarization-dependent waveguide, where the first mapping relationship is a mapping relationship between a coupling center wavelength in the TE polarization mode and the width of the TE polarization-dependent waveguide.

602. Determine a second mapping relationship according to a grating equation and a correspondence between an effective refractive index in the TM polarization mode and a width of a TM polarization-dependent waveguide, where the second mapping relationship is a mapping relationship between a coupling center wavelength in the TM polarization mode and the width of the TM polarization-dependent waveguide.

603. Determine a width set of polarization-independent waveguides according to the first mapping relationship and the second mapping relationship, so that coupling efficiency generated when a polarization-independent waveguide whose width is within the width set transmits an optical signal that has a specified center wavelength and that is in the TE polarization mode is greater than a third preset threshold, and coupling efficiency generated when the polarization-independent waveguide whose width is within the width set transmits an optical signal that has a specified center wavelength and that is in the TM polarization mode is greater than the third preset threshold.

604. Prepare the polarization-independent waveguides according to the width set of the polarization-independent waveguides.

The polarization-independent waveguides are prepared according to the width set determined in step 603, so that the waveguide array may include multiple polarization-independent waveguides or the waveguides in the waveguide array are all polarization-independent waveguides, so as to increase a bandwidth and coupling efficiency of the grating coupler for an optical signal and increase an amount of optical signal information that can be transmitted. For details, reference may be made to description in the apparatus embodiment.

Further, the foregoing step 202 may include connecting at least two waveguides that have different widths using a second tapered waveguide to form a waveguide chain. The second tapered waveguide used to connect the waveguides that have different widths can reduce an energy loss generated when an optical signal is transferred from a waveguide with a width to another waveguide that has a different width for transmission.

In addition, in the foregoing grating coupler provided in this embodiment of the present disclosure, the prior art such as a DBR, a metal reflection layer, a polycrystalline silicon layer, and a refractive index matching liquid may further be combined to increase the coupling efficiency of the grating coupler.

This embodiment of the present disclosure provides the grating coupler preparation method. A waveguide array of a waveguide core layer in a grating coupler obtained by means of preparation includes at least two waveguide groups, each waveguide group includes at least one waveguide chain, and each waveguide chain includes at least two waveguides that have different widths. Therefore, the grating coupler may include multiple waveguides that have different widths, and may correspond to multiple different effective refractive indexes, so that multiple coupling center wavelengths and sub-normalized transmission spectrum can be generated. Therefore, a total normalized transmission spectrum of the grating coupler is superposition of sub-normalized transmission spectra of the multiple waveguides that have different widths. Compared with a normalized transmission spectrum of a conventional grating coupler usually including waveguides that have only one width, the grating coupler provided in the embodiments of the present disclosure can significantly increase a bandwidth, so as to resolve a problem in the prior art that a bandwidth of the conventional grating coupler is low.

In the several embodiments provided in this application, it should be understood that the disclosed grating coupler and the preparation method thereof may be implemented in other manners. The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A grating coupler, comprising:
    a substrate layer, a lower confining layer, a waveguide core layer, and an upper confining layer that are sequentially disposed upon, respectively,
    the waveguide core layer comprising a submicron waveguide, a first tapered waveguide, a second tapered waveguide, and a waveguide array,
    the waveguide array comprising at least two waveguide groups,
    each waveguide group of the at least two waveguide groups comprising at least one waveguide chain,
    the waveguide chain comprising at least two waveguides that have different widths and are connected to each other, waveguides in waveguide chains comprised in a same waveguide group having a same width and a same arrangement structure, and waveguides in the waveguide chains comprised in different waveguide groups having at least one of different widths or different arrangement structures,
    an end of the waveguide chain in the waveguide array being connected to a wide end of the first tapered waveguide, and a narrow end of the first tapered waveguide being connected to the submicron waveguide,
    the second tapered waveguide connecting the waveguides that have different widths in the waveguide chain, and
    the waveguides in the waveguide array comprising polarization-independent waveguides,
    wherein a polarization-dependent loss (PDL) generated is less than a first preset threshold when the polarization-independent waveguide transmits a first optical signal having a specified center wavelength and in a transverse electric (TE) polarization mode and transmits a second optical signal having a specified center wavelength and in a transverse magnetic (TM) polarization mode.

2. The grating coupler according to claim 1, wherein two adjacent waveguides in the waveguide chain have different widths, and two adjacent waveguides located in adjacent waveguide chains have different widths.

3. The grating coupler according to claim 2, wherein the waveguide array comprises a first waveguide group and a second waveguide group, the first waveguide group comprising a first waveguide chain, the second waveguide group comprising a second waveguide chain, the first waveguide chain comprising a first waveguide and a second waveguide, the first waveguide and the second waveguide having different widths and are adjacently arranged, the second waveguide chain comprising a third waveguide and a fourth waveguide, the third waveguide and the fourth waveguide having different widths and are adjacently arranged, the first waveguide and the third waveguide having different widths and are adjacently arranged, and the second waveguide and the fourth waveguide having different widths and are adjacently arranged.

4. The grating coupler according to claim 1, wherein coupling efficiency generated is greater than a second preset threshold when the polarization-independent waveguide transmits the first optical signal having the specified center wavelength and in the TE polarization mode, and coupling efficiency generated being greater than the second preset threshold when the polarization-independent waveguide transmits the second optical signal having the specified center wavelength and in the TM polarization mode.

5. The grating coupler according to claim 1, wherein the waveguides in the waveguide array are all the polarization-independent waveguides.

6. The grating coupler according to claim 1, wherein the waveguide chains are arranged in parallel, or wherein the waveguide chains are arranged at a specific angle to form a sector ring waveguide array.

7. The grating coupler according to claim 1, wherein the waveguide in the waveguide array is a strip waveguide, a ridge waveguide, or a slot waveguide.

8. A grating coupler preparation method, comprising:
    preparing a substrate layer;
    preparing a lower confining layer disposed on the substrate layer;
    preparing a waveguide core layer disposed on the lower confining layer, the waveguide core layer comprising a submicron waveguide, a first tapered waveguide, and a waveguide array, the waveguide array comprising at least two waveguide groups, each waveguide group of the at least two waveguide groups comprising at least one waveguide chain, the waveguide chain comprising at least two waveguides that have different widths and are connected to each other, waveguides in waveguide chains comprised in a same waveguide group having a same width and a same arrangement structure, waveguides in the waveguide chains comprised in different waveguide groups having at least one of different widths or different arrangement structures, an end of the waveguide chain in the waveguide array being connected to a wide end of the first tapered waveguide, and a narrow end of the first tapered waveguide being connected to the submicron waveguide, the waveguides that have different widths in the waveguide chain being connected using a second tapered waveguide; and preparing an upper confining layer disposed on the waveguide core layer, the waveguides in the waveguide array comprising polarization-independent waveguides, and wherein a polarization-dependent loss (PDL) generated is less than a first preset threshold when the polarization-independent waveguide transmits a first optical signal having a specified center wavelength and in a transverse electric (TE) polarization mode and transmits a second optical signal having a specified center wavelength and in a transverse magnetic (TM) polarization mode.

9. The method according to claim 8, wherein preparing the waveguide core layer comprises:

preparing the waveguides;

connecting the at least two waveguides having different widths to form the waveguide chain;

arranging the waveguide chains to form the waveguide array, so that the waveguide array comprises the at least two waveguide groups, the waveguide group comprising at least one waveguide chain, waveguides in the waveguide chains comprised in a same waveguide group having a same width and a same arrangement structure, and waveguides in the waveguide chains comprised in different waveguide groups having at least one of different widths or different arrangement structures;

connecting an end of the waveguide chain in the waveguide array to the wide end of the first tapered waveguide; and connecting the narrow end of the first tapered waveguide to the submicron waveguide, so as to form the waveguide core layer.

10. The method according to claim 8, wherein two adjacent waveguides in the waveguide chain have different widths, and two adjacent waveguides located in adjacent waveguide chains have different widths.

11. The method according to claim 8, wherein coupling efficiency generated is greater than a second preset threshold when the polarization-independent waveguide transmits the first optical signal having the specified center wavelength and in the TE polarization mode, and wherein coupling efficiency generated is greater than the second preset threshold when the polarization-independent waveguide transmits the second optical signal having the specified center wavelength and in the TM polarization mode.

12. The grating coupler according to claim 1, wherein the first preset threshold is 0.1 decibel.

13. The grating coupler according to claim 4, wherein the second preset threshold is 80%.

14. The method according to claim 8, wherein the first preset threshold is 0.1 decibel.

15. The method according to claim 11, wherein the second preset threshold is 80%.

* * * * *

UNITED STATES PATENT AND TRADEMARK OFFICE
CERTIFICATE OF CORRECTION

PATENT NO.          : 10,317,584 B2
APPLICATION NO.     : 15/835748
DATED               : June 11, 2019
INVENTOR(S)         : Ming Li, Xin Tu and Hongyan Fu Page 1 of 1

It is certified that error appears in the above-identified patent and that said Letters Patent is hereby corrected as shown below:

In the Claims

Column 22, Line 41: "claim 1" should read "claim 4"

Signed and Sealed this
Sixth Day of August, 2019

Andrei Iancu
*Director of the United States Patent and Trademark Office*